United States Patent
Sabo

(10) Patent No.: US 7,296,836 B1
(45) Date of Patent: Nov. 20, 2007

(54) TRUCK RACK APPARATUS

(76) Inventor: Zeljko Sabo, 3073 Ceylon Rd., Costa Mesa, CA (US) 92626

(*) Notice: Subject to any disclaimer, the term of this patent is extended or adjusted under 35 U.S.C. 154(b) by 523 days.

(21) Appl. No.: 10/861,631

(22) Filed: Jun. 7, 2004

(51) Int. Cl.
*B60P 3/00* (2006.01)

(52) U.S. Cl. .......................................................... 296/3

(58) Field of Classification Search .................... 296/3, 296/405, 403
See application file for complete search history.

(56) References Cited

U.S. PATENT DOCUMENTS

| | | | | |
|---|---|---|---|---|
| 4,398,763 A | * | 8/1983 | Louw | 296/3 |
| 4,659,131 A | | 4/1987 | Flournoy, Jr. | |
| 4,770,458 A | | 9/1988 | Burke et al. | |
| 4,934,572 A | * | 6/1990 | Bowman et al. | 224/558 |
| 5,002,324 A | | 3/1991 | Griffin | |
| 5,037,152 A | | 8/1991 | Hendricks | |
| 5,108,141 A | * | 4/1992 | Anderson | 296/3 |
| 5,431,472 A | * | 7/1995 | Coffland | 296/3 |
| 5,494,327 A | * | 2/1996 | Derecktor | 296/3 |
| 5,692,791 A | * | 12/1997 | Sulzer | 296/3 |
| 5,743,583 A | | 4/1998 | Lowe | |
| D398,284 S | * | 9/1998 | Carter et al. | D12/406 |
| 5,988,195 A | * | 11/1999 | Kaestner et al. | 135/144 |
| RE36,835 E | * | 8/2000 | Shumate et al. | 224/402 |
| D436,915 S | | 1/2001 | Burger | |
| 6,186,571 B1 | * | 2/2001 | Burke | 296/3 |
| 6,513,849 B2 | * | 2/2003 | Carter | 296/3 |
| 6,971,563 B2 | * | 12/2005 | Levi | 224/405 |

* cited by examiner

*Primary Examiner*—Dennis H. Pedder
*Assistant Examiner*—Mike Hernandez

(57) ABSTRACT

A truck rack apparatus includes a first support and a second support. Each of the first and second supports includes a first leg, a second leg and an elongated arm extending between and is attached to the first and second legs. The first and second legs each extend away from an associated one of the arms in generally the same direction. Each of the first and second legs has an upper end and bottom end. The arms are positioned adjacent to respective ones of the upper ends. Each of a plurality of securing assemblies is adapted for being releasably securing one of the bottom ends of the legs to one of a pair of inwardly extending lips attached to the side walls of a pick-up bed. The securing assemblies attach the legs to the lips so that the legs extend upwardly from the bed and the arms traverse the bed.

8 Claims, 7 Drawing Sheets

TRUCK RACK APPARATUS

BACKGROUND OF THE INVENTION

1. Field of the Invention

The present invention relates to rack devices and more particularly pertains to a new rack device for supporting material above a pick-up truck bed.

2. Description of the Prior Art

The use of rack devices is known in the prior art. U.S. Pat. No. 5,037,152 describes a device that includes adjustable poles that are mountable on and extendable across a pick-up bed. The poles are telescoping to ensure that they properly fit across the bed. Another type of rack device is U.S. Pat. No. 4,659,131 having a plurality of vertically orientated posts that are removably extendable into the sides of a pick-up bed so that the posts are vertically supported. The top ends of the posts are secured to horizontal members onto which items may be positioned. Yet another such device is U.S. Pat. No. 5,743,583 which includes posts that are pivotally coupled to supports that are positioned on an upper edge of side walls of a pick-up bed so that the posts may be selectively positioned in a horizontal position or a vertical position.

While these devices fulfill their respective, particular objectives and requirements, the need remains for a device that includes a method for releasably securing collapsible posts to a pick-up bed so that the posts may be easily erected into a vertical position or taken down and stored within the pick-up bed.

SUMMARY OF THE INVENTION

The present invention meets the needs presented above by generally including a first support and a second support. Each of the first and second supports includes a first leg, a second leg and an elongated arm extending between and is attached to the first and second legs. The first and second legs each extend away from an associated one of the arms in generally the same direction. Each of the first and second legs has an upper end and bottom end. The arms are positioned adjacent to respective ones of the upper ends. Each of a plurality of securing assemblies is adapted for being releasably securing one of the bottom ends of the legs to one of a pair of inwardly extending lips attached to the side walls of a pick-up bed. The securing assemblies attach the legs to the lips so that the legs extend upwardly from the bed and the arms traverse the bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
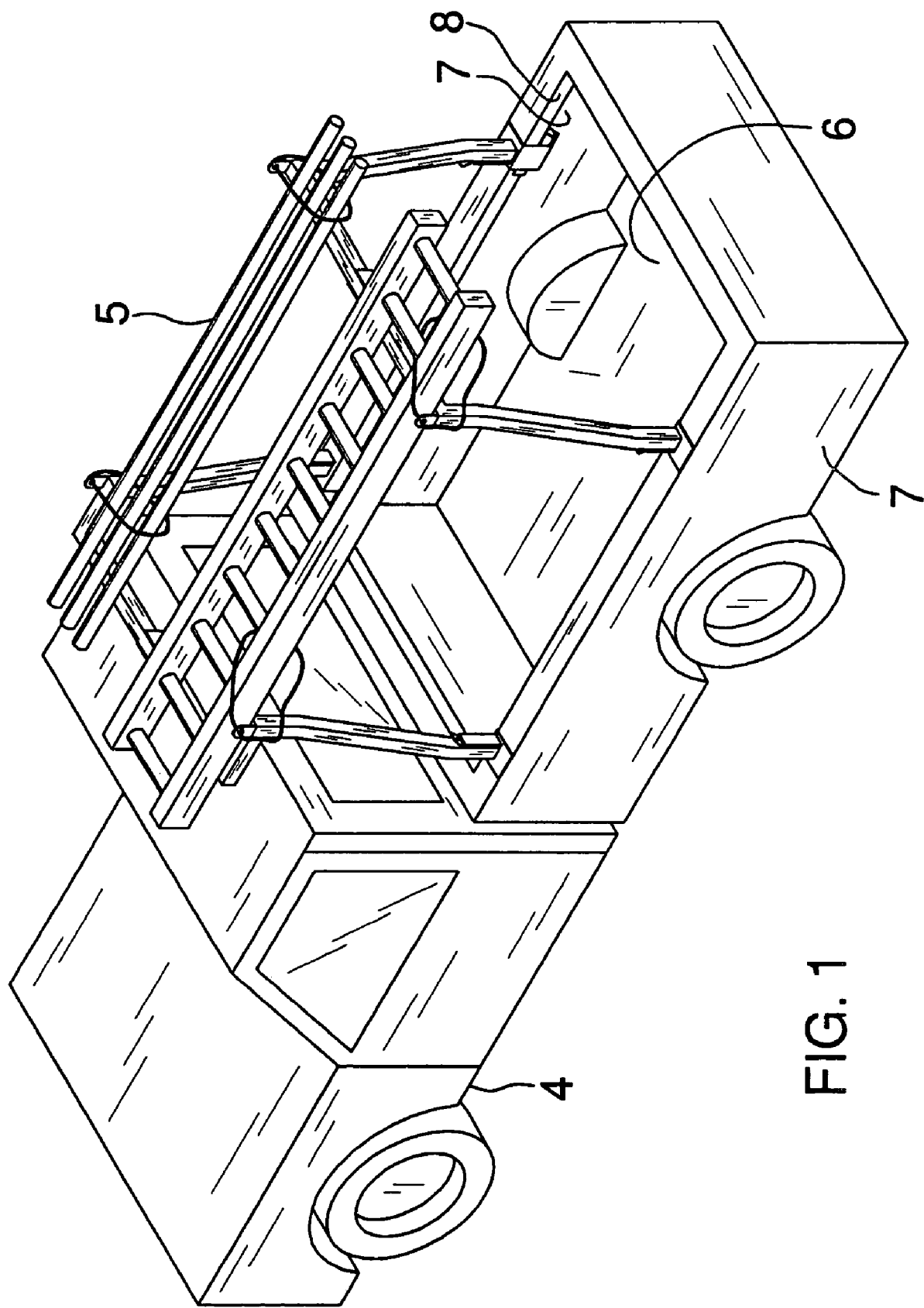
FIG. 1 is a perspective in use view of a truck rack apparatus according to the present invention.
Figure 2:
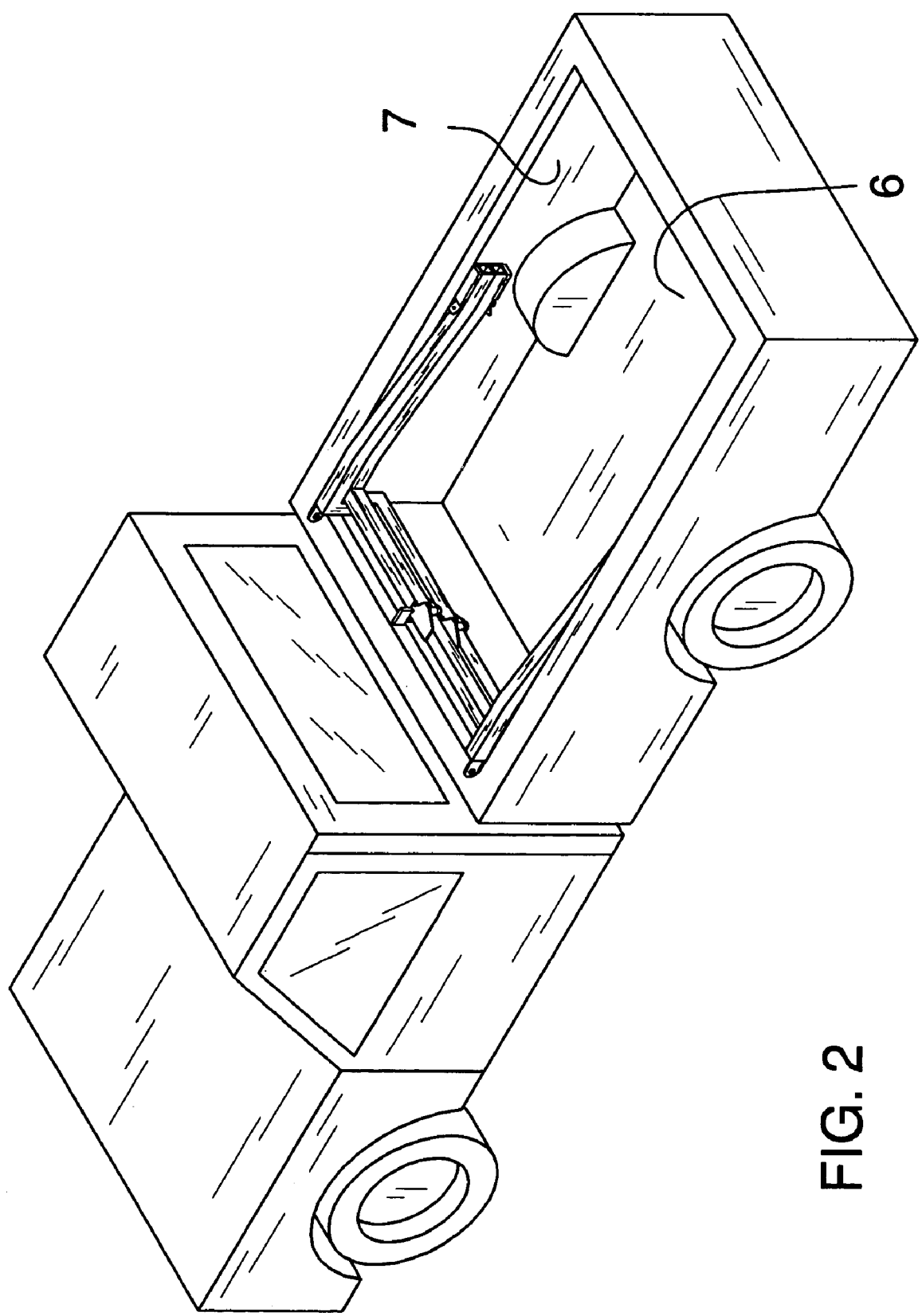
FIG. 2 is a perspective view of the present invention in a stored position.
Figure 3:
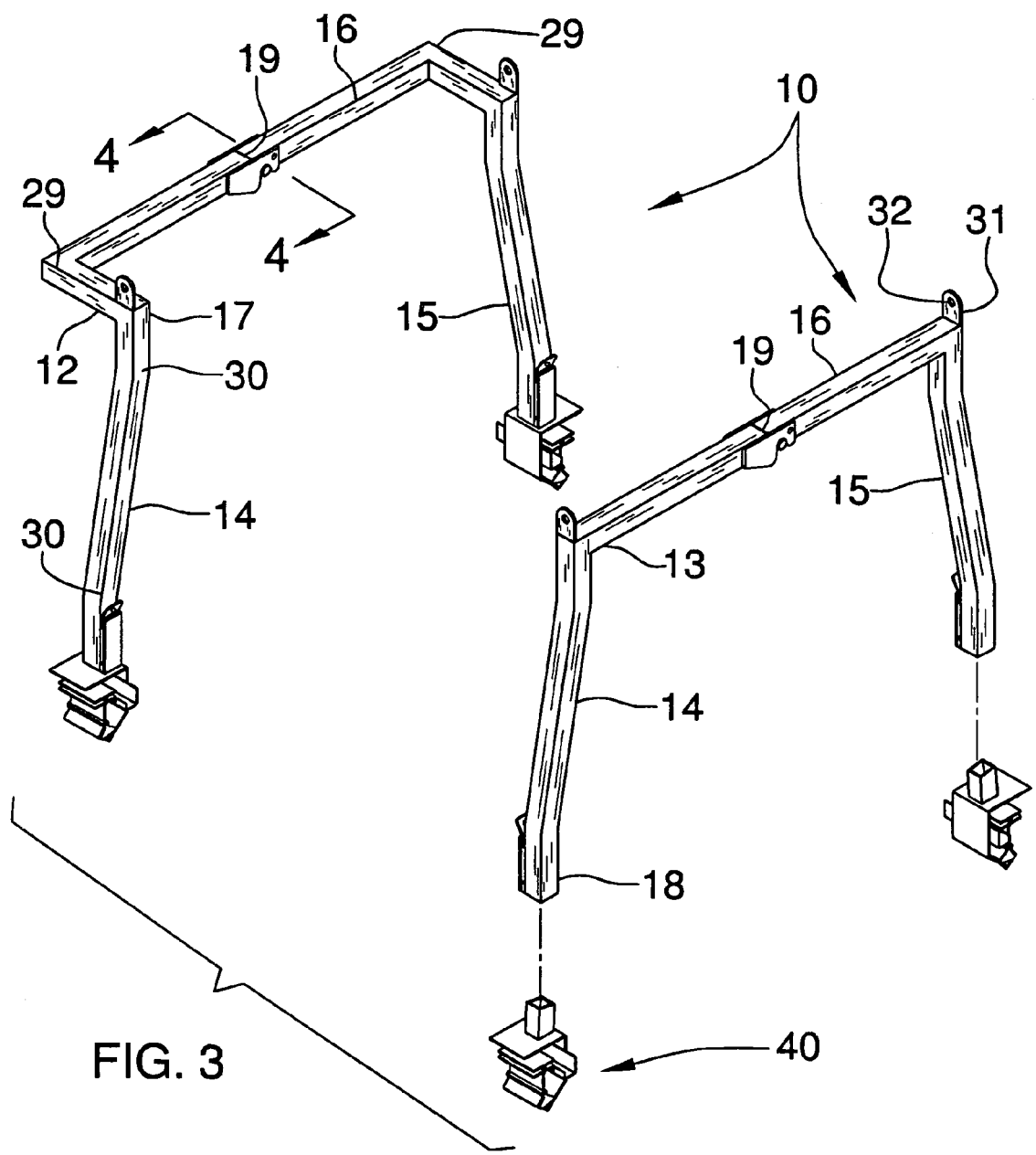
FIG. 3 is a perspective view of the present invention.
Figure 4:
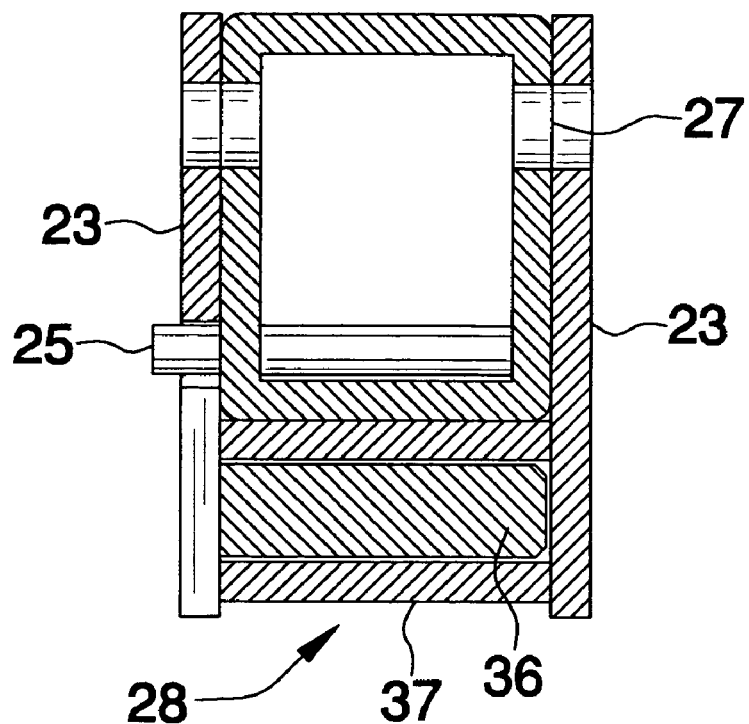
FIG. 4 is a cross-sectional view taken along line 4-4 of FIG. 3 of the present invention.
Figure 5:
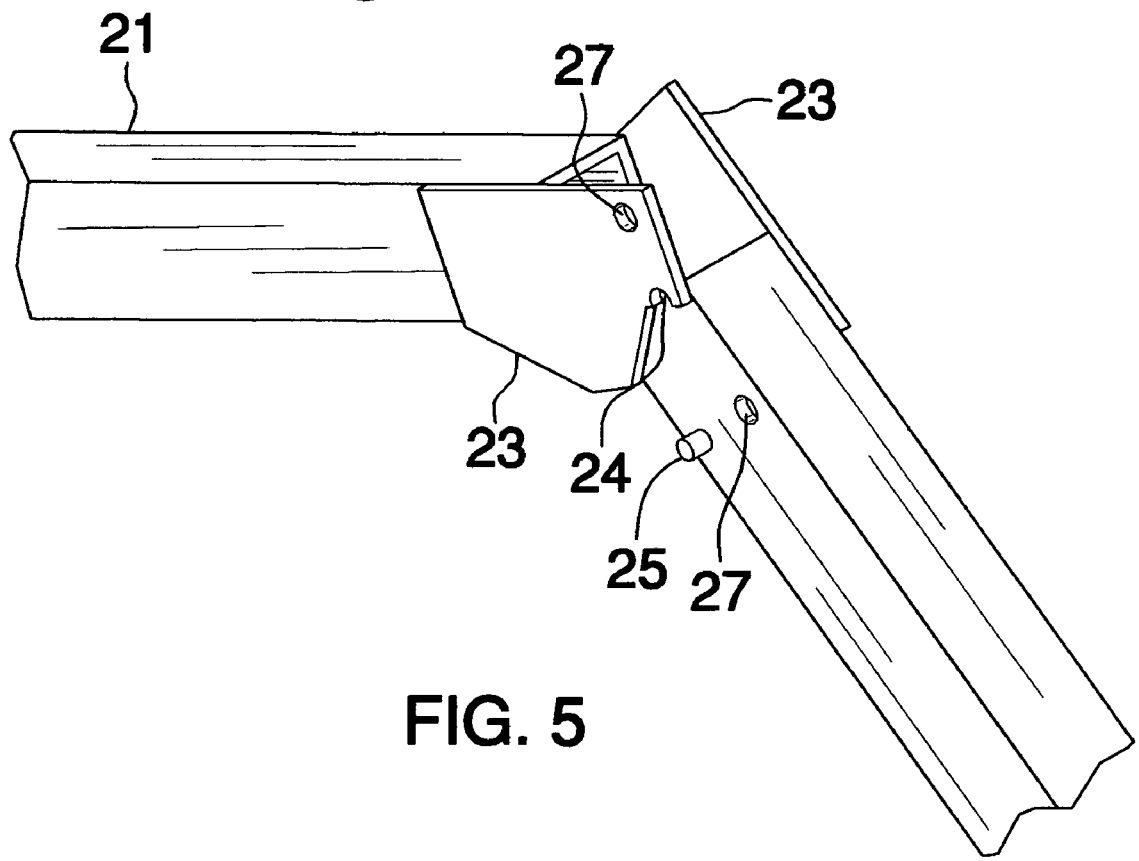
FIG. 5 is a perspective view of one of the arms of the present invention.
Figure 6:
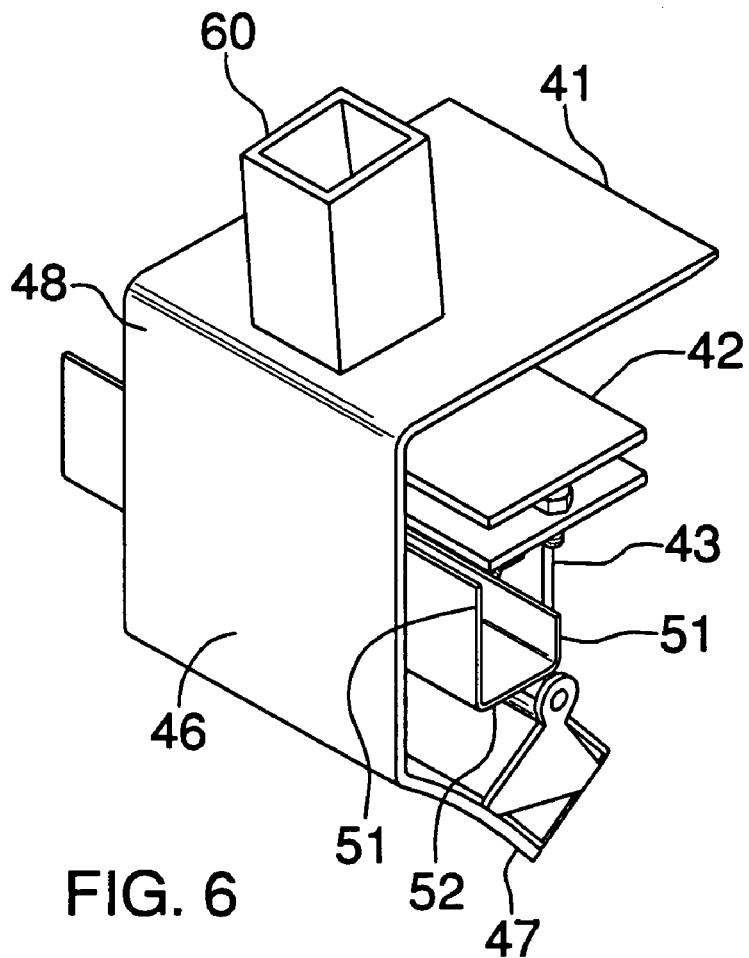
FIG. 6 is a perspective view of a securing assembly the present invention.
Figure 7:
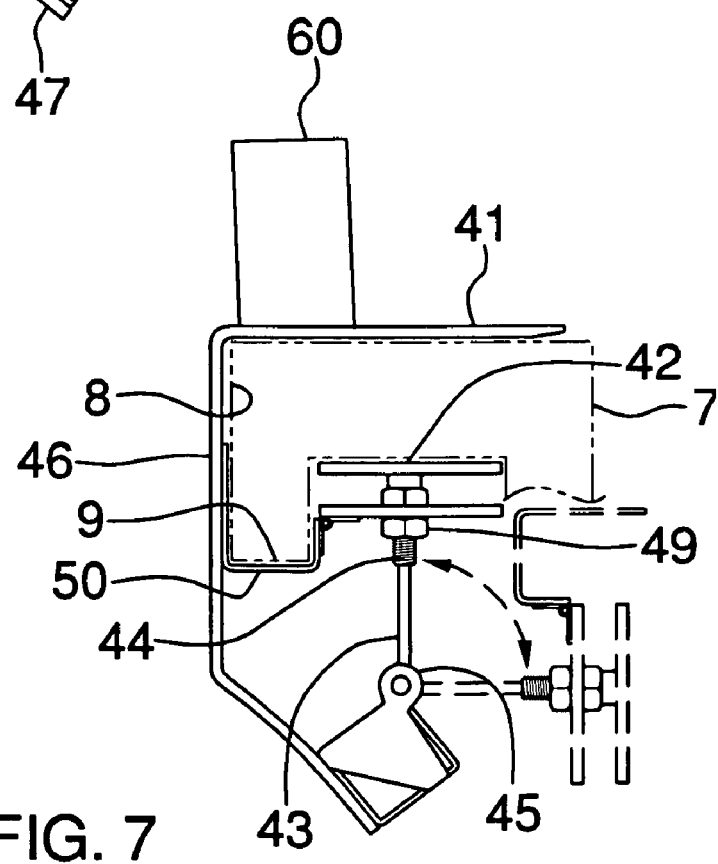
FIG. 7 is a side view of a securing assembly of the present invention.
Figure 8:
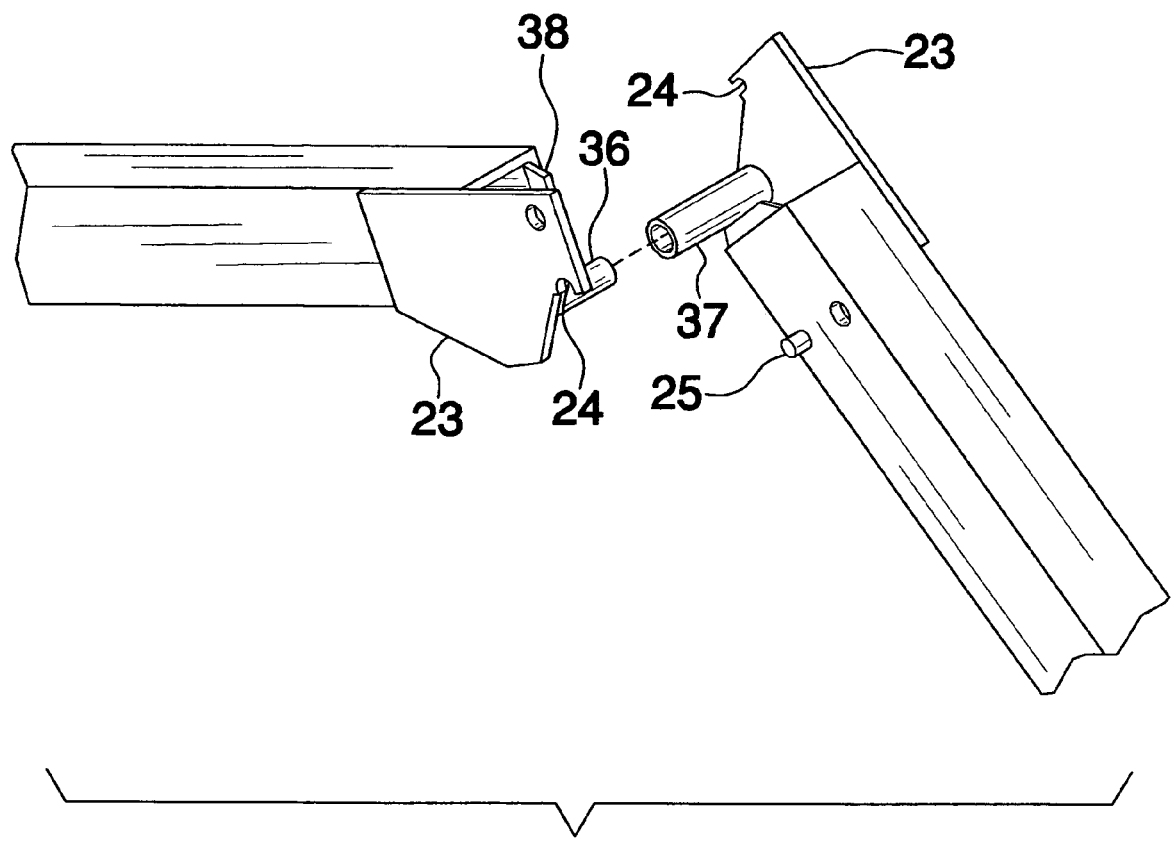
FIG. 8 is a perspective view of one of the arms of the present invention.
Figure 9:
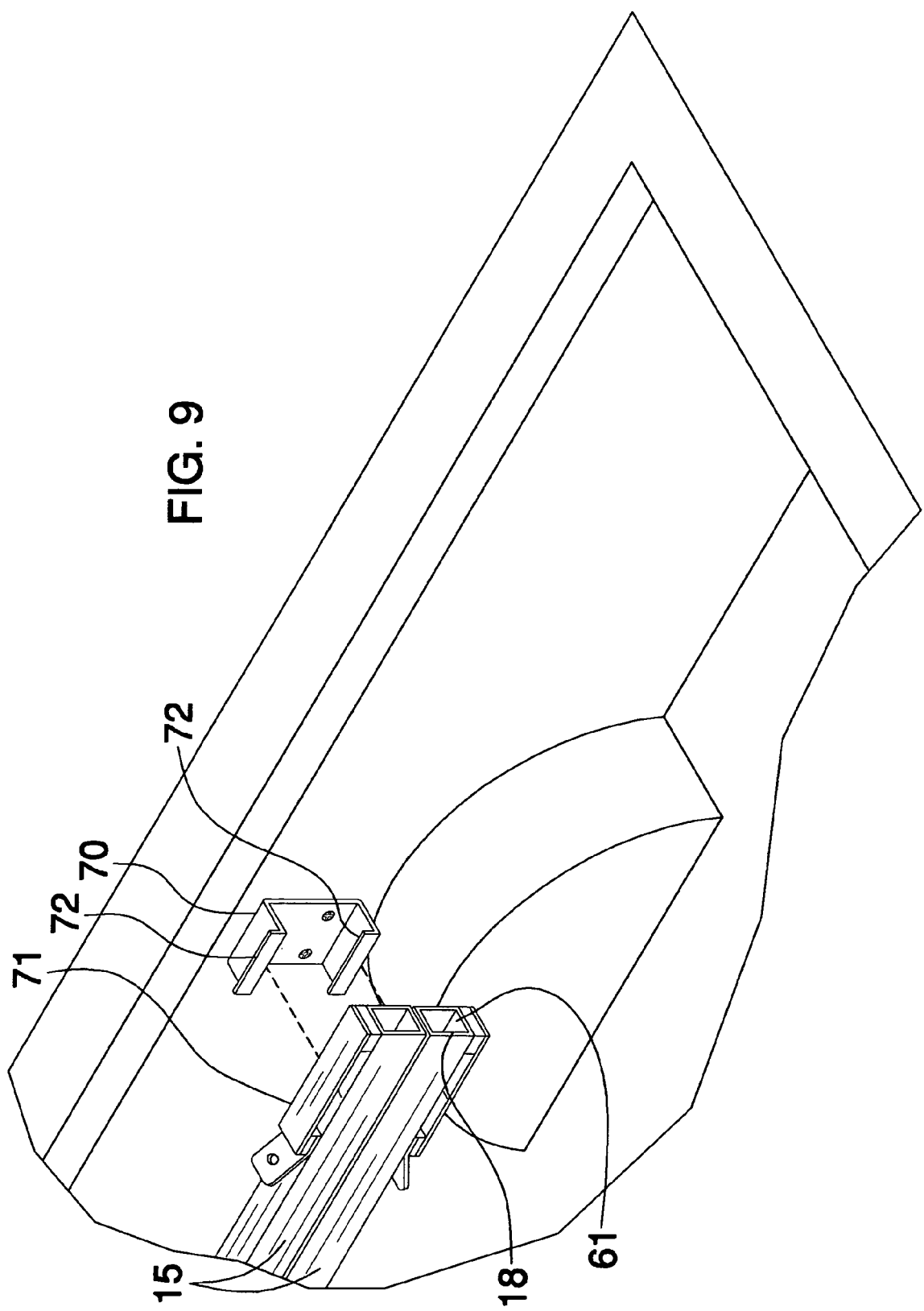
FIG. 9 is an enlarged perspective view of the present invention in the stored position.

With reference now to the drawings, and in particular to FIGS. 1 through 9 thereof, a new rack device embodying the principles and concepts of the present invention and generally designated by the reference numeral 10 will be described.

As best illustrated in FIGS. 1 through 9, the truck rack apparatus 10 generally comprises a support assembly for selectively mounting material 5 above a pick-up bed 6. The bed 6 is bounded by a pair of side walls 7 each having an upper edge. Each of a pair of inwardly extending lips 8 is attached to one of the upper edges of the side walls 7 such that the lips 8 extend toward each other from the oppositely positioned side walls. Downwardly extending flanges 9 are typically attached to the lips 8.

The apparatus 10 includes a first support 12 and a second support 13. Each of the first 12 and second 13 supports includes a first leg 14, a second leg 15 and an elongated arm 16 extending between and attached to the first 14 and second 15 legs. The first 14 and second 15 legs each extend away from an associated one of the arms 16 in generally the same direction. Each of the first 14 and second 15 legs has an upper end 17 and bottom end 18. The arms 16 are positioned adjacent to respective ones of the upper ends 17. Each of the arms 16 has break 19 therein such that a first portion 20 and a second portion 21 of each of the arms 16 is defined.

A plurality of couplers 22 is attached to the first 20 and second 21 portions for selectively coupling the first 20 and second 21 portions together. The couplers 22 preferably include braces 23 attached to each of the first 20 and second 21 portions adjacent to the break 19 and positioned so that the braces 23 are positioned on opposite sides of the arm 16 when the first 20 and second 21 portions are joined. The braces 23 each have a bottom edge having a slot 24 therein. Posts 25 are positioned opposite of the braces 23 so that the posts 25 extend into the slots 24 when the first 20 and second 21 portions are positioned together so that gravity retains the posts 25 within the slots 24. Alignable holes 27 may be utilized for receiving a locking pin for locking the braces in place. A hinge 28 may be used to hingedly couple the first 20 and second 21 portions together so that they may be folded up in the stored position. The hinge 28 is formed from an interlocking rod 36 and cylinder 37 combination. Locking flaps 38, attached to the ends of the first 20 and second portion opposite of a corresponding one of the braces 23, may be selectively biased outwardly against the braces 23 to add stability to the device.

The arm 16 of the first support 12 has a pair of bends 29 therein. Each of the bends 29 forms substantially perpendicular angles such that the arm 16 of the first support 12 is generally U-shapes and lies in a plane orientated perpendicular to a plane of the first 14 and second 15 arms of the first support 12. The legs 14, 15 each have a length generally between 2 feet and 3½ feet. The arms 16 have a length such that the bottom ends 18 of the legs 14, 15 are spaced a distance generally equal to a width of the bed 6. It is also preferred that the each of the legs 14, 15 have a pair of bends 30 therein so that the legs 14, 15 extend slightly inward toward the arms 16. This positions the legs 14, 15 substantially over the bed 6 when the legs 14, 15 are mounted on a truck 4.

Each of a plurality of tabs 31 is attached to one of the upper ends 17 of the first 14 and second 15 legs such that each of the legs 14, 15 has at least one tab 31 attached thereto. Each of the tabs 31 extends away from the upper ends 17 so that the tabs 31 extend upwardly when the legs 14, 15 are vertically orientated. The tabs 31 each have an aperture 32 extending therethrough.

Each of a plurality of securing assemblies 40 is adapted for being releasably securing one of the bottom ends 18 of the legs to one of the inwardly extending lips 8 such that the legs 14, 15 extend upwardly from the bed 6 and the arms 16 traverse the bed 6. Each of the securing assemblies 40 includes a bracket attachment that is adapted for being selectively attached to the lip 8. The bracket attachment includes a support plate 41 and a biasing plate 42 spaced from each other and hingedly coupled together with an attachment means. The support plate 41 is selectively positioned on an upper surface of the lip 8 and the biasing plate 42 is positioned on a lower surface of the lip such that the biasing plate 42 biases the support plate 41 against the upper surface of the lip 7 by pulling the support plate 41 against the lip 8. The attachment means includes a post 43 and a connector plate 46. The post 43 has a first end 44 and a second end 45. The second end 45 is hingedly coupled to a bottom portion 47 of the connector plate 46. An upper portion 48 of the connector plate 46 is attached to edge of the support plate 41 such that the support plate 41 is generally perpendicularly orientated to the connector plate 46 and the connector plate 46 is spaced from the biasing plate 42.

The biasing plate 42 is attached to the first end 44 of the post 43 with an adjustable fastener 49 such that the biasing plate 42 is selectively moveable nearer to or further away from the second end 45 of the post 43. This is preferably accomplished with a threaded post 43 and a fastener 49 that is threadably coupled to the post 43. The biasing plate 42 lies a plane orientated perpendicular to a longitudinal axis of the post 43. The biasing plate 42 is first abutted against the lower surface of the lip 8 and then the support plate 41 is snapped into position so that the lip 8 is secured between the biasing plate 42 and the support plate 41. If the fit is not secure enough, the biasing plate 42 may be moved upwardly to tighten the fit.

An elongated saddle 50 is preferably attached to the bracket attachment and is positioned for removably receiving the downwardly extending flange 9 attached to the lip 8. The saddle 50 includes a pair of vertical walls 51 and a bottom wall 52 attached together in a U-shaped configuration. The vertical walls 51 are orientated generally parallel to the upper portion 48 of the connector plate 46. The saddle 50 is positioned between the post 43 and the connector plate 46.

A protruding member 60 is attached to and extends upwardly from the support plate 41. The protruding member 60 is removably extendable into wells 61 extending upwardly into the bottom ends 18 of the legs 14, 15.

A plurality of connecting members 70 is adapted for releasably connecting each of the first 14 and second 15 legs to one of the side walls 7 in a stored position. The connecting members 70 are preferably attached to the side walls and include U-shaped brackets that the legs 14, 15 can be positioned in. Clips 71 may be attached to the legs for engaging the brackets to further secure the legs 14, 15 in place. The connecting members 70 may include upwardly extending members for preventing the clips from sliding off of the connecting members 70.

In use, the securing assemblies 40 are attached to lips 8 and positioned opposite with respect to each other. The protruding members 60 are extended into the legs 14, 15 so that the arms 16 extend over the bed 6 as shown in FIG. 1. It is preferred that that arm 16 of the first support 12 is positioned over a cab of the truck 4 to provide support extending forward from the bed 6. Elongated items are positioned on the arms 16 and secured thereto with tethers such as bungee cords or ropes. The tabs 31 provide convenient tie-down areas.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A support assembly for selectively mounting material above a pick-up bed, the bed being bounded by a pair of side walls each having an upper edge, each of a pair of inwardly extending lips being attached to one of the upper edges of the side walls such that the lips extend toward each other from the oppositely positioned side walls, said assembly including:

a first support and a second support, each of said first and second supports including a first leg, a second leg and an elongated arm extending between and being attached to said first and second legs, said first and second legs each extending away from an associated one of said arms in generally the same direction, each of said first and second legs having an upper end and bottom end, said arms being positioned adjacent to respective ones of said upper ends;

a plurality of securing assemblies, each of said securing assemblies being adapted for being releasably securing one of said bottom ends of said legs to one of the inwardly extending lips such that said legs extend upwardly from the bed and said arms traverse the bed, each of said securing assemblies includes;

a bracket attachment being adapted for being selectively attached to the lip, said bracket attachment including a support plate and a biasing plate spaced from each other and hingedly coupled together with an attachment means, said support plate being selectively positioned on an upper surface of the lip and the biasing plate being positioned on a lower surface of the lip such that the biasing plate biases the support plate against the upper surface;

a protruding member being attached to and extending upwardly from said support plate, said protruding member being removably extendable into wells extending into said bottom ends of said legs;

said attachment means including a post and a connector plate, said post having a first end and a second end, said second end being hingedly coupled to a bottom portion of said connector plate, an upper portion of said connector plate being attached to an edge of said support plate such that said support plate is generally perpendicularly orientated to said connector plate and said connector plate is spaced from said biasing plate, said biasing plate being attached to said first end of said post with an adjustable fastener such that said biasing plate is selectively moveable nearer to or further away from said second end of said post, said biasing plate lying in a plane orientated perpendicular to a longitudinal axis of said post; and an elongated saddle being attached to said bracket attachment and being positioned for removably receiving a downwardly extending flange attached to the lip.

2. The assembly according to claim 1, wherein each of said arms having a break therein such that a first portion and a second portion of each of said arms is defined, a plurality of couplers being attached to said first and second portions for selectively coupling said first and second portions together.

3. The assembly according to claim 1, wherein said arm of said first support has a pair of bends therein, each of said bends forming substantially perpendicular angles such that said arm of said first support is generally U-shaped and lies in a plane orientated perpendicular to a plane of said first and second arms of said first support.

4. The assembly according to claim 2, wherein said arm of said first support has a pair of bends therein, each of said bends forming substantially perpendicular angles such that said arm of said first support is generally U-shaped and lies in a plane orientated perpendicular to a plane of said first and second arms of said first support.

5. The assembly according to claim 1, further including a plurality of tabs, each of said tabs being attached to one of said upper ends of said first and second legs such that each of said legs has at least one tab attached thereto, each of said tabs extending away from said upper ends such that said tabs extend upwardly when said legs are vertically orientated, each of said tabs having an aperture extending therethrough.

6. The assembly according to claim 1, further including a plurality of connecting members being adapted for releasably connecting each of said first and second legs to one of the side walls in a stored position.

7. The assembly according to claim 1, further including a plurality of connecting members being adapted for releasably connecting each of said first and second legs to one of the side walls in a stored position.

8. A support assembly for selectively mounting material above a pick-up bed, the bed being bounded by a pair of side walls each having an upper edge, each of a pair of inwardly extending lips being attached to one of the upper edges of the side walls such that the lips extend toward each other from the oppositely positioned side walls, said assembly including:

a first support and a second support, each of said first and second supports including a first leg, a second leg and an elongated arm extending between and being attached to said first and second legs, said first and second legs each extending away from an associated one of said arms in generally the same direction, each of said first and second legs having an upper end and bottom end, said arms being positioned adjacent to respective ones of said upper ends, each of said arms having a break therein such that a first portion and a second portion of each of said arms is defined, a plurality of couplers being attached to said first and second portions for selectively coupling said first and second portions together, said arm of said first support having a pair of bends therein, each of said bends forming substantially perpendicular angles such that said arm of said first support is generally U-shaped and lies in a plane orientated perpendicular to a plane of said first and second arms of said first support;

a plurality of tabs, each of said tabs being attached to one of said upper ends of said first and second legs such that each of said legs has at least one tab attached thereto, each of said tabs extending away from said upper ends such that said tabs extend upwardly when said legs are vertically orientated, each of said tabs having an aperture extending therethrough;

a plurality of securing assemblies, each of said securing assemblies being adapted for being releasably securing one of said bottom ends of said legs to one of the inwardly extending lips such that said legs extend upwardly from the bed and said arms traverse the bed, wherein each of said securing assemblies includes;

a bracket attachment being adapted for being selectively attached to the lip, said bracket attachment including a support plate and a biasing plate spaced from each other and hingedly coupled together with an attachment means, said support plate being selectively positioned on an upper surface of the lip and the biasing plate being positioned on a lower surface of the lip such that the biasing plate biases the support plate against the upper surface, said attachment means including a post and a connector plate, said post having a first end and a second end, said second end being hingedly coupled to a bottom portion of said connector plate, an upper portion of said connector plate being attached to an edge of said support plate such that said support plate is generally perpendicularly orientated to said connector plate and said connector plate is spaced from said biasing plate, said biasing plate being attached to said first end of said post with an adjustable fastener such that said biasing plate is selectively moveable nearer to or further away from said second end of said post, said biasing plate lying in a plane orientated perpendicular to a longitudinal axis of said post;

an elongated saddle being attached to said bracket attachment and being positioned for removably receiving a downwardly extending flange attached to the lip;

a protruding member being attached to and extending upwardly from said support plate, said protruding being removably extendable into wells extending into said bottom ends of said legs; and a plurality of connecting members being adapted for releasably connecting each of said first and second legs to one of the side walls in a stored position.

* * * * *